(12) United States Patent
Chen

(10) Patent No.: US 11,448,662 B2
(45) Date of Patent: Sep. 20, 2022

(54) SENSING DEVICE AND SENSING SYSTEM FOR HUMAN-POWERED DEVICES USING THE SAME

(71) Applicant: Tsu-Te Chen, Tainan (TW)

(72) Inventor: Tsu-Te Chen, Tainan (TW)

(*) Notice: Subject to any disclaimer, the term of this patent is extended or adjusted under 35 U.S.C. 154(b) by 693 days.

(21) Appl. No.: 16/453,031

(22) Filed: Jun. 26, 2019

(65) Prior Publication Data

US 2020/0408798 A1 Dec. 31, 2020

(51) Int. Cl.
| | | |
|---|---|---|
| *G01P 15/00* | (2006.01) | |
| *B62M 6/55* | (2010.01) | |
| *B62M 6/50* | (2010.01) | |
| *B62J 45/415* | (2020.01) | |

(52) U.S. Cl.
CPC ............ *G01P 15/00* (2013.01); *B62M 6/50* (2013.01); *B62M 6/55* (2013.01); *B62J 45/4152* (2020.02)

(58) Field of Classification Search
CPC ............................ G01P 15/00; B62M 6/50–55
See application file for complete search history.

(56) References Cited

U.S. PATENT DOCUMENTS

| | | | |
|---|---|---|---|
| 7,975,561 B1 | 7/2011 | Ambrosina et al. | |
| 8,370,087 B2 | 2/2013 | Zhu et al. | |
| 9,352,911 B2 | 5/2016 | Hearn | |
| 9,404,819 B2 | 8/2016 | Zhu et al. | |
| 2012/0303195 A1* | 11/2012 | Boyle | G01L 3/247 701/22 |
| 2017/0361898 A1* | 12/2017 | Huang | G01L 3/1407 |
| 2017/0370785 A1* | 12/2017 | Jenn | B62M 6/50 |
| 2019/0099119 A1 | 4/2019 | Wakeham et al. | |

FOREIGN PATENT DOCUMENTS

| | | | | |
|---|---|---|---|---|
| CN | 206664844 U | * | 11/2017 | ............. B62M 6/50 |
| CN | 109866865 A | * | 6/2019 | ............. B62M 6/50 |
| CN | 110466663 A | * | 11/2019 | ............. B62M 3/16 |

OTHER PUBLICATIONS

Tsu-Te Chen; Design and Implementation of Pedelec Torque Sensing by Load Cell and Strategies of Power Assistant; Thesis for Master of Science, Jul. 2018, Department of Electrical Engineering, Kun Shan University.

* cited by examiner

*Primary Examiner* — Calvin Cheung
(74) *Attorney, Agent, or Firm* — Rosenberg, Klein & Lee

(57) ABSTRACT

A sensing device has a strain gauge device, an idler, and a connecting rod assembly. The sensing device receives a mechanical force to generate a deformation accordingly, and generates a sensing signal according to the deformation. The idler is a ring body which has a ring contracting portion contacting a transmission belt, so as to receive the mechanical force which the transmission belt applies on the idler. A first end of the connecting rod assembly is connected to the strain gauge device via a rod slot which is located on a side of the strain gauge device, and a second end of the connecting rod assembly is pivotally connected to the idler via a pivot connecting portion of the idler, such that the mechanical force which the idler suffers can be transmitted to the strain gauge device.

20 Claims, 5 Drawing Sheets

SENSING DEVICE AND SENSING SYSTEM FOR HUMAN-POWERED DEVICES USING THE SAME

BACKGROUND

1. Technical Field

The invention relates to a sensing device, more particularly, to a sensing device using a strain gauge device to receive a mechanical force and to generate a sensing signal, and can be applied in a sensing system and a human-powered device.

2. Description of Related Art

Electric assisted bicycle, or pedelec, is the most popular topic among bike-related industries because it is light and convenient like a bicycle but without the hard work of a bicycle when going uphill, against the wind, and carrying objects. Hence, a rider can comfortably ride the electric assisted bicycle in any condition.

The pedelec is a conventional bicycle equipped with electrical components and battery, in combination with a power system having a sensor as its core and using the sensor to sense the pedaling force of the rider, the pedelec knows the rider's pedaling intension and in response, provides suitable electric assisted power.

Some of the conventional electric assisted bicycles use torque sensor as the sensing device to sense the pedaling force of the rider. Some of the high-end conventional electric assisted bicycles use a more technical-advanced sensing device, dual side torque sensor. The dual side torque sensor is advantaged in high precision, minimal delay, speedy power response, and long lifecycle. However, the conventional electric assisted bicycle that comes with the dual side torque sensor has an expensive price tag and so its market share is low.

Moreover, some of the mid- to low-end conventional electric assisted bicycle products widely use other types of sensors, such as dropout sensor, torsion spring sensor, cadence sensor, and etc. The aforementioned sensors are similar in functionality, but have disadvantages like short lifecycle, low precision, delay in the output of electric assisted power, and thus when the rider is in need of electric assisted power, the electric assisted power system cannot accurately and timely provide the electric assisted power, which in turn resulting in an uncomfortable riding experience for riders.

SUMMARY

An object of the invention is to solve the aforementioned issue in the conventional technology and thus a sensing device with a strain gauge device, an idler, and a connecting rode assembly is provided. The combination of strain gauge device, idler and connecting rod assembly is lower in cost and can be used to sense a mechanical force applied by a transmission belt, through which the pedaling force of a rider is sensed. Therefore, a sensing system of an electric assisted bicycle can determine whether to provide electric assisted power and how much to provide base on the pedaling force of the rider. Although the sensing device is lower in cost, it still has good measurement precision, and hence it has market advantage.

It is an object of the invention to provide a sensing device. The sensing device includes an idler, a strain gauge device, and a connecting rod assembly. The idler is a ring body with a pivotal connecting portion and a ring contacting portion. The strain gauge device includes a rod slot disposed on a side thereof. The connecting rod assembly includes a first end and a second end. The ring contacting portion of the idler is in contact with a transmission belt to receive a mechanical force applied to the idler by the transmission belt. The connecting rod assembly transmits the mechanical force from the idler to the strain gauge device, and the strain gauge device receives the mechanical force to generate a deformation and further generates a sensing signal according to the deformation.

Optionally, the strain gauge device includes a load cell, and the load cell is a compression load cell, an S-type load cell, a shear beam load cell, a single point load cell, or an annular load cell.

Optionally, the ring contacting portion of the idler includes a plurality of first teeth, and the transmission belt includes a plurality of second teeth, wherein the plurality of first teeth faces the plurality of second teeth.

Optionally, the connecting rod assembly is a steel connecting rod made of metal material.

Optionally, the first end of the connecting rod assembly is tightly fixed in the rod slot of the strain gauge device.

Optionally, the transmission belt is a drive chain or a drive belt.

Optionally, the sensing signal is a voltage signal.

Optionally, the load cell of the strain gauge device includes an elastic body and a strain gauge circuit. The strain gauge circuit is disposed on the elastic body and is formed by a plurality of electrical conductors. When the elastic body deforms, at least one of the electrical conductors also deforms to generate the sensing signal.

It is another object of the invention to provide a sensing system. The sensing system can be implemented in a human-powered device, including a bicycle, an indoor bicycle, or an indoor training platform. The sensing system includes a sensing device, a signal output device, and a computing processor. The sensing device is like the sensing device mentioned above. The signal output device is electrically or communicatively connected to the sensing device and to the computing processor. The signal output device receives the sensing signal and the computing processor obtains and processes the sensing signal.

Optionally, the sensing system calibrates torque by using body weight calibration or weight calibration.

Optionally, the human-powered device includes a crank or a chainwheel, wherein the transmission belt is in synchronization with the crank or the chainwheel, the sensing device measures a crank angle and an angular velocity of the left and right cranks, and the computing processor calculates a real time power and a calorie consumption. The sensing system further measures a leg power of each leg relative to the angle of the crank or the chainwheel for reference in real time riding or for use in raining.

Optionally, the human-powered device includes a crank or a chainwheel, wherein the transmission belt is in synchronization with the crank or the chainwheel, the sensing system includes an automatic zeroing function or a manually zeroing function. When the sensing signal is lower than a threshold value for more than a specific time period, the sensing system automatically zeroes and is thereby calibrated.

Optionally, the sensing system further comprises an optical sensor or a magnetic sensor that is in synchronization with the transmission belt of the human-powered device, wherein the human-powered device further includes a crank or a chainwheel and the transmission belt is in synchronization with the crank or the chainwheel, and the sensing system measures a force angle of each leg, an angle of the crank or the chainwheel, and a cadence.

Optionally, a plurality of riding parameters of a rider is automatically captured by the sensing system based on the rider's bodyweight, or is manually input into the sensing system by the rider, and the plurality of riding parameters are recorded and output by the sensing system.

Optionally, the bicycle is a pedelec, and the sensing system further includes an electric assisted power output module electrically or communicatively connected to the computing processor. The electric assisted power output module generates an electric assisted power base on the sensing signal and the riding parameters.

Optionally, when the sensing signal is lower than a threshold for more than a specific time period, the sensing system automatically undergoes an angle reset calibration.

It is another object of the invention to provide an electric assisted bicycle (pedelec) that includes a sensing device as described above, a bicycle, a signal output device, a computing processor, and an electric assisted power output module. The electric assisted bicycle includes riding parameters stored or recorded therein. The sensing device is disposed on the bicycle, the signal output device is electrically or communicatively connected to the sensing device and the computing processor, and the electric assisted power output module is electrically or communicatively connected to the computing processor. The signal output device receives the sensing signal. The computing processor calculates a drive signal and data base on the sensing signal and the riding parameters. The electric assisted power output module generates an electric assisted power base on the drive signal and displays the data.

The sensing device provided by the invention uses a strain gauge device, which cost less, to sense the mechanical force of the transmission belt and to automatically capture riding parameters of a rider. Because the measurement precision is kept at a good standard, when sensing systems and electric assisted bicycles are equipped with the sensing device, they are competitive in the market price-wise and functionality-wise.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DESCRIPTION OF THE EXEMPLARY EMBODIMENTS

In comparison to the conventional technology using expensive dual side torque sensors to detect the pedaling force of a rider, the invention provides a sensor composed of a strain gauge device, an idler, and a connecting rod assembly. Not only is the sensor low in cost and its measurement precision close to the dual side torque sensor, the idler synchronizes with a transmission belt, and through the idler and the sensor, the angle of a crank or a chainwheel and an angular velocity or a speed of the transmission belt can be measured precisely. Furthermore, the strain gauge device is designed to have a rod slot on its side, through which the connecting rod assembly and the strain gauge device are connected. The idler is pivotally connected to the connecting rod assembly, and a ring contacting portion of the idler is in contact with or engaged to the transmission belt of the electric assisted bicycle so as to transmit the mechanical force of the transmission belt, which corresponds to the pedaling force of the rider, to the strain gauge device through the idler and the connecting rod assembly. Thus, the strain gauge device can sense or detect the mechanical force, and in turn generate a sensing signal, thereby the sensor can generate a corresponding electric assisted power base on the sensing signal to the electric assisted bicycle and measure the speed of a drive wheel, which is the bicycle speed, through the speed of the transmission belt.

Figure 1:
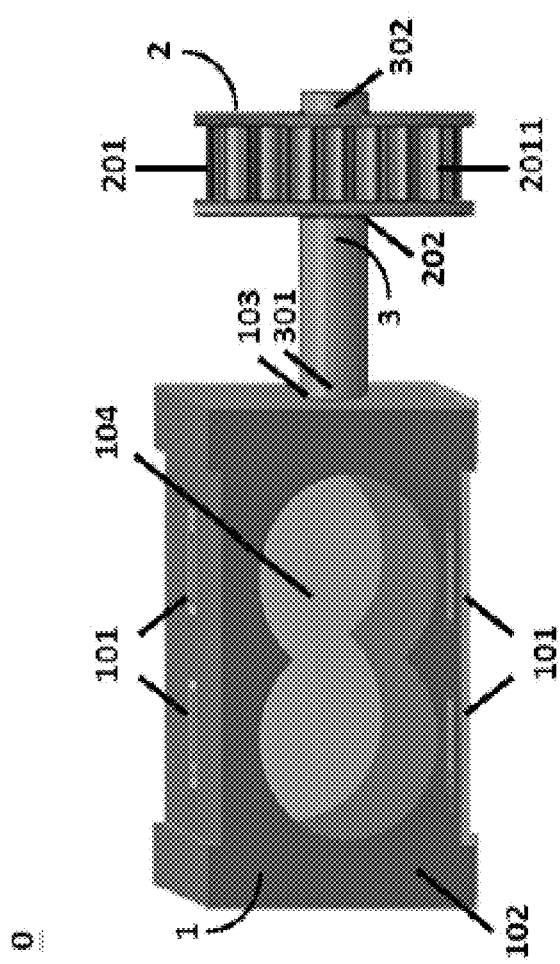
FIG. 1 is a schematic diagram of a sensing device according to an embodiment of the invention.

FIG. 1 is a schematic diagram of a sensing device according to an embodiment of the invention. The sensing device 0 includes a strain gauge device 1, an idler 2, and a connecting rod 3, wherein the sensing device 0 is used to receive a mechanical force and generate a sensing signal. The mechanical force is transmitted from a transmission belt in contact with or engaged to the idler 2, and relates to a pedaling force of a user riding an electric assisted bicycle.

As shown in FIG. 1, the strain gauge device 1 includes a load cell composed of an elastic body 102 and a strain gauge circuit that is formed by a plurality of electrical conductors 101, wherein the plurality of electrical conductors 101 are respectively positioned on the top and bottom sides of the elastic body 102. The elastic body 102 is designed to have a rod slot 103 on its side and to be hollow in the center to form a double-ring hollow region 104, and thus the strain gauge device 1 becomes a shear beam strain gauge device. It is to be noted that the load cell of the strain gauge device 1 is described herein as the shear beam load cell but the invention does not limit the types of the load cell, for example, other types such as compression load cells, S-type load cells, single point load cells, and annular load cells can all be utilized in the invention.

The idler is a ring body and has a ring contacting portion 201 and a pivot connecting portion 202. The ring contacting portion 201 includes a plurality of first teeth 2011, wherein the shape of the first teeth 2011 corresponds to the shape of a plurality of second teeth of a transmission belt which the ring contacting portion 201 is in contact with, such that the first teeth 2011 are in engagement with the second teeth of the transmission belt. The connecting rod 3 has a first end 301 and a second end 302, wherein the first end 301 of the connecting rod 3 is connected to the strain gauge device 1 via the rod slot 103, and the second end of the connecting rod 3 is pivotally connected to the idler 2 via the pivot connecting portion 202 so the idler 2 can rotate around the connecting rod 3 as a center axis.

The strain gauge device 1 is composed of the strain gauge circuit, which is formed by the plurality of electrical conductors 101, and the elastic body 102, and is a sensor that is capable of transforming a mechanical force into a sensing signal, wherein the sensing signal is a voltage signal. The elastic body 201 can be made of steel or aluminum, the invention is not limited thereby, and with load, the elastic body 201 would have a quantitated deformation in respond to the mechanical force but would subsequently return to its original position and shape. Through the changes in resistance due to the deformation, the plurality of electrical conductors 101 obtain different voltage signals and thereby generating the sensing signal. In addition, the strain gauge circuit formed by the plurality of electrical conductors 101 can be a Wheatstone bridge but the invention is not limited thereby.

More specifically, when the elastic body 102 is deformed, the electrical conductors 101 are pulled and become elongated or retracted and become shortened, causing the resistance in each electrical conductor to change and output a voltage signal, and these voltage signals form the sensing signal. To sum up, the sensing signal is related to the deformation of the strain gauge device 1 and the deformation is generated by the mechanical force transmitted to the strain gauge device 1.

Referring to FIG. 1, the idler 2 has 22 first teeth 2011 in the ring contacting portion 201. The second end 302 of the connecting rod 3 is pivotally connected to the pivot connecting portion 202 of the idler 2, and the first end 301 of the connecting rod 3 is connected to the strain gauge device 1 through the rod slot 103, wherein the rod slot 103 could have anaerobic adhesive disposed therein. The connecting rod 3 is a steel body made of metal material for transmitting the mechanical force applied to the idler 2 to the load cell, so the strain gauge device 1 can generate the sensing signal. The anaerobic adhesive is used for tightly fitting and fixing purpose and the invention is not limited thereby, any other methods that can achieve the purpose of fixing components tightly can be utilized in the invention.

Figure 2:
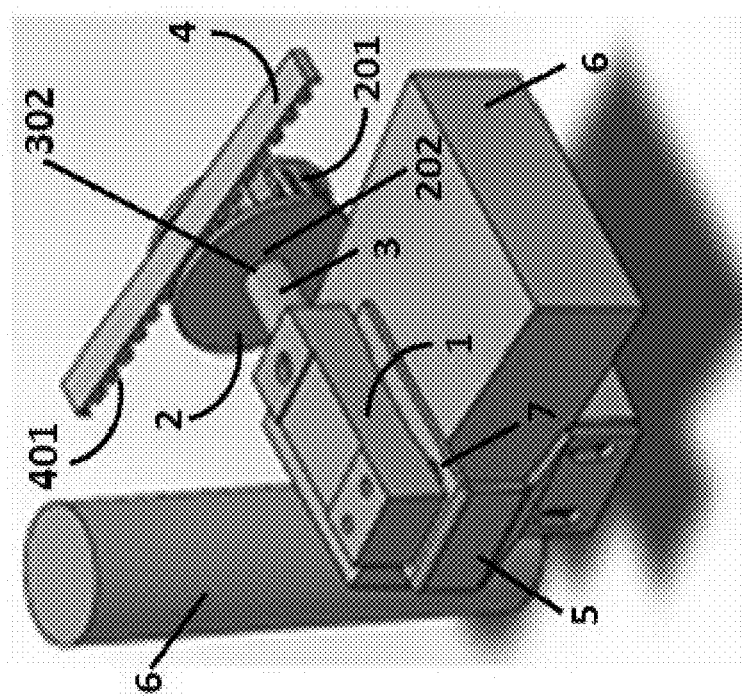
FIG. 2 is a schematic diagram of a sensing device installed in an electric assisted bicycle according to an embodiment of the invention.
Figure 3:
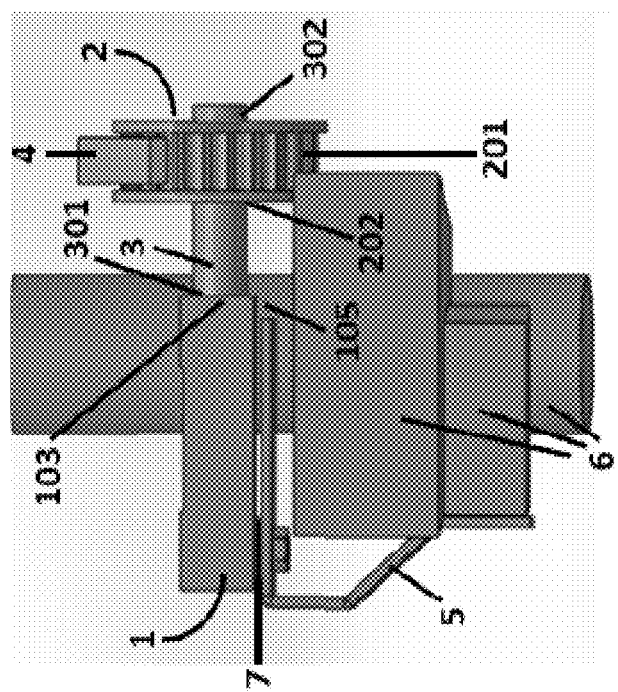
FIG. 3 is a side view of a sensing device installed in an electric assisted bicycle according to an embodiment of the invention.

In another embodiment, the sensing device is installed or mounted on a sensing system such that it can be applied or implemented in a sensing system of an electric assisted bicycle. As shown in FIGS. 2 and 3, the sensing device is installed or mounted on a rod body of a bicycle 6 by using a reinforcement part 5, and a transmission belt 4 of the bicycle 6 interacts with the idler 2 via engagement or contact. In specific, a second teeth portion 401 of the transmission belt 4 is correspondingly in contact with the ring contacting portion 201 of the idler 2, wherein the transmission belt 4 of the bicycle 6 is a drive chain or a drive belt. Since the connecting rod 3 is the steel body connecting the idler 2 and the strain gauge device 1, the mechanical force applied to the idler 2 by the transmission belt 4 can be transmitted to the strain gauge device 1 through the connecting rod 3, so the strain gauge device 1 can generate the sensing signal. It is to be noted that the connecting rod 3 can be a single connecting rod, or a connecting rod assembly having at least one connecting rod or a combination of other elements, the invention is not limited thereby.

Preferably, when the sensing device of the invention is mounted or installed on the bicycle 6, the strain gauge device 1 is disposed on the reinforcement part 5 with only one end fixed to the reinforcement part 5 as shown in FIG. 3. More specifically, a washer 7 is disposed between the strain gauge device 1 and the reinforcement part 5, so that when the strain gauge device 1 deforms, a non-fixed end 105 does not touch the reinforcement part 5 or the bicycle 6, which in turn lowers the chance of misjudging the mechanical force by the strain gauge device 1.

Figure 4:
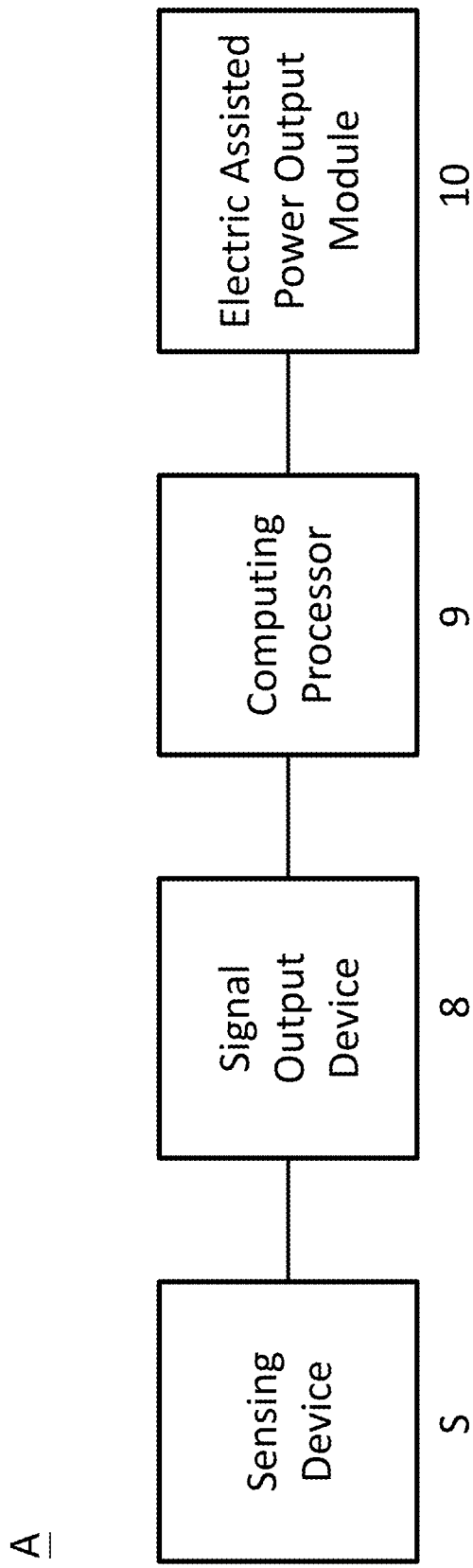
FIG. 4 is a functional block diagram of a sensing system according to an embodiment of the invention.

FIG. 4 is a functional block diagram of a sensing system according to an embodiment of the invention. The sensing system A includes a sensing device S, a signal output device 8, a computing processor 9, and an electric assisted power output module 10. The sensing device 0 will be used to describe the sensing device S in the sensing system A, however, it is only for exemplary purpose and does not limit the invention thereby; the invention does not limit the type of sensing device S.

The signal output device 8 is electrically or communicatively connected to the sensing device S and the computing processor 9, and the electric assisted power output module 10 is electrically or communicatively connected to the computing processor 9. The sensing device S receives the mechanical force and generates a sensing signal and the signal output device 8 receives the sensing signal. The computing processor 9 calculates a drive signal and data base on the sensing signal, wherein the data is, for example, a dissipated power and leg powers of both legs corresponding to a crank angle or a chaninwheel angle that will be described later. At last, the electric assisted power output module 10 generates an electric assisted power base on the drive signal, the data, and the riding parameters and displays the data. Hence, the sensing device S senses the mechanical force and generates the corresponding sensing signal, and thus the sensing system A generates the corresponding electric assisted power according to the sensing signal.

Moreover, the sensing system A can be calibrated at the factory or when it's needed, to accurately reflect the mechanical force applied to the idler. For example, calibration can be done with bodyweight or weight and includes torque calibration, tolerance calibration, or other types of calibration, and the invention does not limit the calibration methods and calibration content. For instance, the sensing system can be calibrated at the factory using weights of 10 kg, 20 kg, 30 kg, 40 kg, and 50 kg, and through the relationship between the torque values from actual measurement and the readings of the sensing device S obtained by the computing processor 9, the sensing system can be calibrated accordingly. The readings of the sensing device S is the values of the sensing signal. In addition, it is found in experiments that the relationship is linear. Moreover, after the sensing system is put in use and the readings of the sensing device S obtained by the computing processor 9 is inaccurate and deviated due to factors like aged components and such, the user can calibrate the sensing system A by zeroing the system manually or automatically.

Furthermore, the sensing system A can be designed to automatically or manually perform calibration before the user ride or use the electric assisted bicycle or the spin bicycle having the sensing system A to correct the deviation in the sensing device S. In other words, the readings of the sensing device S are zeroed during calibration. Further, when the bicycle is stationary or the readings of the sensing device S is lower than a threshold value for a certain time or a specific time period, the sensing system A will automatically calibrate by zeroing.

Figure 5:
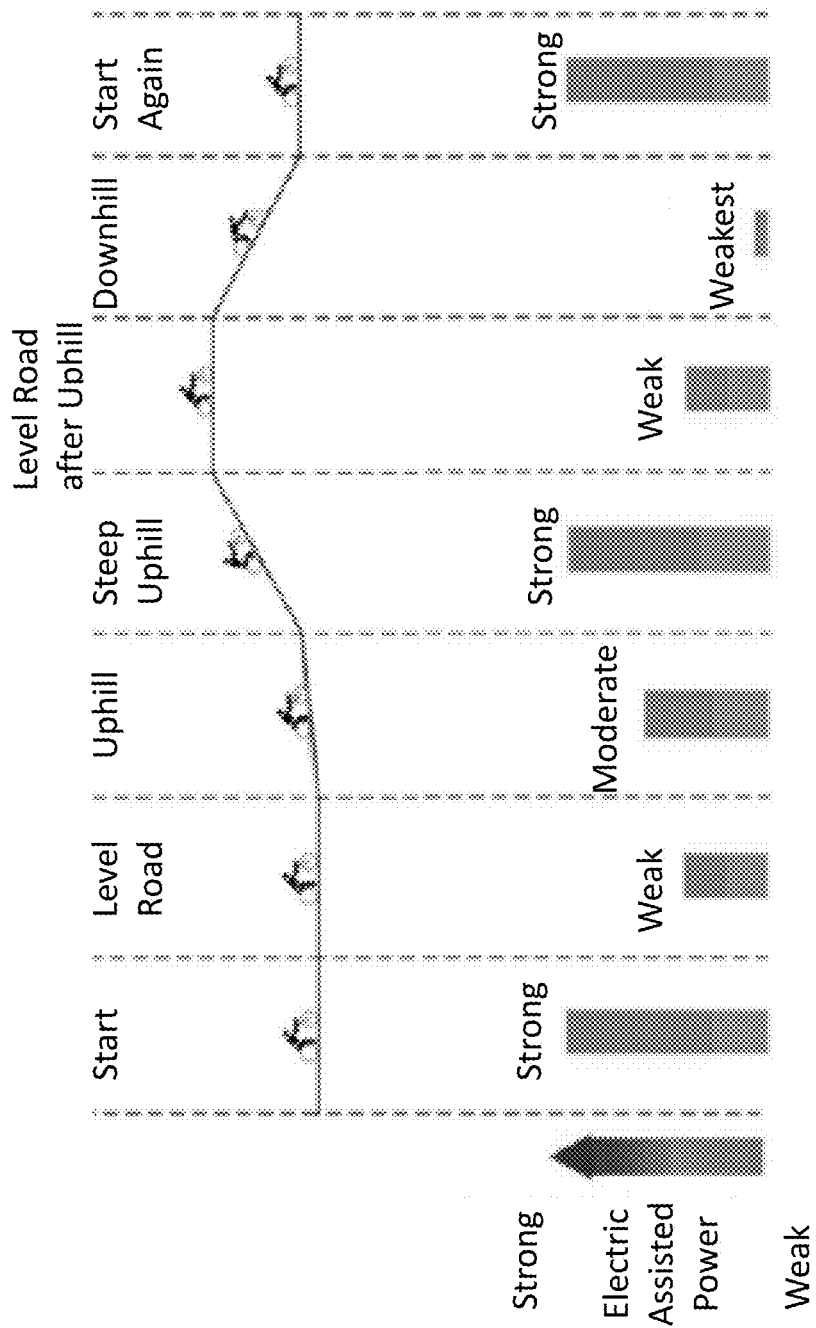
FIG. 5 is a bar chart illustrating electric assisted powers output by a sensing system of an electric assisted bicycle in different riding scenarios according to an embodiment of the invention.

Additionally, when the sensing system of the invention is implemented in the electric assisted bicycle, the sensing device can be used to sense the pedaling force, the real time power and the crank angle, and the sensing system can provide the electric assisted power corresponding thereto in real time. Referring to FIG. 5, the sensing system of the invention provides four levels of electric assisted power, which are strong, moderate, weak, and weakest, wherein the weakest level could be close to zero power. It is to be noted that the four levels of power is merely an example and the invention is not limited thereby.

As shown in FIG. 5, when the riding path is split into different stages like start, level road, uphill, steep uphill, level road after uphill, downhill, and start again, the rider would apply different pedaling forces at different path stages, and by using the sensing system to sense the pedaling forces, the electric assisted bicycle can provide strong, moderate, weak and weakest electric assisted forces accordingly.

The rider applies a large pedaling force to start riding the electric assisted bicycle, and the electric assisted bicycle senses the pedaling force through the sensing system and provides a strong electric assisted power. When the riding path is level road, the pedaling force applied by the rider is reduced and thus the sensing system provides a weak electric assisted power. Upon encountering the uphill, the rider increases the pedaling force and a moderate electric assisted power is provided by the sensing system. As the uphill slop gets steep, the rider pedals with more force and the sensing system provides a strong electric assisted power. Because the pedaling force applied by the rider is reduced again when the riding path becomes level road after the uphill, the sensing system changes the electric assisted power to weak. If the riding path is downhill, the sensing system would provide the weakest electric assisted power because the rider pedals very lightly on the electric assisted bicycle. When the rider needs to start riding again, the pedaling force applied on the electric assisted bicycle is strong and therefore the sensing system provides the strong electric assisted power again.

In the aforementioned embodiment, the sensing system is used as an electric assisted booster system. However, the sensing system can also be used in a human-powered device, wherein the human-powered device includes bicycles, spin bicycles, and training platforms. Spin bicycles and training platforms can be used in an indoor facility. Referring back to FIG. 4, when the sensing system A is implemented in the spin bicycle or the training platform, the sensing system A does not include the electric assisted power output module 10. Since the drive system, like drive chain or drive belt, is in synchronization with the idler and the crank, the left and the right crank angles or chainwheel angles and their angular velocities can be measured, and according to the readings of the sensing device S, the left and right crank/chainwheel angles and their angular velocities obtained, the computing processor 9 can calculate the real time power of each of the two legs relative to the crank angle. Moreover, presume that the forces applied by the rider's two legs and the force angles are unsymmetrical, the computing processor 9 can still calculate calorie consumption of the rider accordingly. In addition, because the drive system is in synchronization with the crank, the aforementioned calibration of the sensing system A also simultaneously calibrates the drive system and the crank. In short, after the sensing signal is lower than the threshold value for a specific time period, an angle reset calibration is performed to the sensing system.

On the other hand, besides being obtained by measuring the number of loops of the idler driven by the drive chain or drive belt in a time unit, the angular velocity can also be measured by other sensors. For example, an optical sensor or a magnetic sensor that synchronizes with the crank or chainwheel can be used to measure angular velocity, force angle of the two legs, crank/chainwheel angle, and cadence. Moreover, the other sensors can also be zeroed either manually or automatically to calibrate deviations in measurement and crank angles. Furthermore, since the sensing device uses the strain gauge device, the bodyweight of the user can also be obtained. The obtained bodyweight allows the sensing system to automatically acknowledge who the user is and then access this user's setting and records. The records include the riding parameters of the user, leg power, and cadence, wherein the riding parameters relate to personal data of the user, such as bodyweight, gender, race, riding habits, health conditions and more, the invention is not limited thereby. Through bodyweight, transmission belt speed, time, and real time power, the dissipated power and leg power corresponding to the crank angle or the chainwheel angle can be calculated, and therefore the riding records of the user can be automatically recorded, captured, and displayed in real time, which then can be used by the user as riding reference or for training purpose. These records can serve as reference data for training riders, and once the values of each leg power corresponding to the crank angle or the chainwheel angle are obtained, the maximum power output of the bicycle, the training platform, and the spin bicycle can be calculated accordingly. In addition, when the sensing system is applied/implemented in the electric assisted bicycle, the electric assisted power output module of the electric assisted bicycle generates corresponding electric assisted power base on the sensing signal and the riding parameters.

Table 1 illustrates a comparison between the sensing device of the invention and other conventional sensors used in electric assisted bicycles. As shown in table 1, the sensing device of the invention utilizes a strain gauge for measurement and when implemented in an electric assisted bicycle, its measurement precision, measurement consistency, and lifecycle are as good as the dual side torque sensors implemented in some of the high-end electric assisted bicycles in the market. The sensing device of the invention, however, is relatively lower in price compare to the dual side torque sensor.

TABLE 1

| Sensor Function | Sensing Device of the invention | Dropout Sensor | Dual Side Torque Sensor | Torsion Spring Sensor | Cadence Sensor | Sentinel Sensor |
| --- | --- | --- | --- | --- | --- | --- |
| Measurement Principle | Strain Gauge | Hall Effect | Eddy Current | Hall Effect | Hall Effect | Hall Effect |
| Measurement Precision | VV | V | VV | X | X | V |
| Measurement Consistency | VV | V | VV | X | V | V |
| Output Response | V | V | VV | X | V | V |
| Installation Method | V | X | X | V | VV | VV |
| Lifecycle | VV | X | VV | X | VV | VV |
| Riding Experience | V | X | VV | X | X | V |

TABLE 1-continued

| Sensor Function | Sensing Device of the invention | Dropout Sensor | Dual Side Torque Sensor | Torsion Spring Sensor | Cadence Sensor | Sentinel Sensor |
|---|---|---|---|---|---|---|
| Size | X | V | X | X | VV | V |
| Price/ CP ratio | Low/ High | Intermediate/ Low | High/ Low | Intermediate/ Low | Low/ Low | Intermediate/ Intermediate |

VV: Excellent
V: Average
X: Poor

Comparing the sensor of the invention to other sensors that are used in some of the mid- to low-end products, like dropout sensors, torsion spring sensors, cadence sensors, and sentinel sensors, they all have the similar low price, but in turns of their performance in measurement precision and measurement consistency, the sensing device of the invention is more superior, and in turns of output response and life cycle, the sensing device of the invention is better or has the same ratings as those other sensors.

Although there is still room for improvement in regards to the size of the sensing device of the invention, the performance of the sensing device in other fields like measurement principle, measurement precision, measurement consistency, output response, installation method, lifecycle, riding experiment, and price/CP ratio shows that the sensing device of the invention is a competitive product.

In conclusion, the embodiments of the invention provide a sensing device, a sensing system and an electric assisted bicycle with technical advantages over the conventional technology.

In conventional technology, the sensors used in some of the high-end electric assisted bicycles are expensive, making its market share difficult to grow, and the sensors used in some of the mid- to low-end electric assisted bicycles have drawbacks like short lifecycle, imprecision, and delay in output electric assisted power, causing it unable to provide suitable electric assisted power at the right time and thus the riders have uncomfortable riding experience. On the contrary, the sensing device, the sensing system, and the electric assisted bicycle described by the embodiments of the invention have high precision and low cost, thereby are competitive in bike-related markets.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A sensing device, adapted to a transmission belt, comprising:
    an idler configured into a ring body and including a pivot connecting portion and a ring contacting portion, the ring contacting portion being in contact with the transmission belt to receive a mechanical force applied to the idler by the transmission belt;
    a strain gauge device including a rod slot disposed on a side of the strain gauge device, and configured to receive the mechanical force to generate a deformation and generates a sensing signal according to the deformation; and
    a connecting rod assembly including a first end and a second end, wherein the first end is connected to the strain gauge device via the rod slot and the second end is connected to the idler via the pivot connecting portion, to transmit the mechanical force from the idler to the strain gauge device.

2. The sensing device of claim 1, wherein the strain gauge device includes a load cell, and the load cell is a compression load cell, an S-type load cell, a shear beam load cell, a single point load cell, or an annular load cell.

3. The sensing device of claim 2, wherein the load cell of the strain gauge device includes:
    an elastic body; and
    a strain gauge circuit disposed on the elastic body and formed by a plurality of electrical conductors, wherein when the elastic body deforms, at least one of the electrical conductors deforms to generate the sensing signal.

4. The sensing device of claim 1, wherein the ring contacting portion of the idler includes a plurality of first teeth, the transmission belt includes a plurality of second teeth, and the first teeth face the second teeth.

5. The sensing device of claim 1, wherein the connecting rod assembly is a steel connecting rod made of metal material.

6. The sensing device of claim 1, wherein the first end of the connecting rod assembly is tightly fixed to the rod slot of the strain gauge device.

7. The sensing device of claim 1, wherein the transmission belt is a drive chain or a drive belt.

8. The sensing device of claim 1, wherein the sensing signal is a voltage signal.

9. A sensing system, suitable for use in a human-powered device, the human-powered device being a bicycle, a spin bicycle, or a training platform and the human-powered device including a transmission belt, the sensing system comprising:
    a sensing device including:
        an idler configured into a ring body and including a pivot connecting portion and a ring contacting portion, the ring contacting portion being in contact with the transmission belt of the human-powered device to receive a mechanical force applied to the idler by the transmission belt;
        a strain gauge device including a rod slot disposed on a side of the strain gauge device, and configured to receive the mechanical force to generate a deformation and generates a sensing signal according to the deformation; and
        a connecting rod assembly including a first end connected to the strain gauge device via the rod slot and a second end connected to the idler via the pivot connecting portion, so as to transmit the mechanical force from the idler to the strain gauge device;
    a signal output device electrically connected or communicatively connected to the sensing device for receiving the sensing signal; and a computing processor electrically connected or communicatively connected to the signal output device for obtaining and processing the sensing signal.

10. The sensing system of claim 9, wherein the sensing system calibrates torque by bodyweight calibration or weight calibration.

11. The sensing system of claim 9, wherein the human-powered device further includes a crank or a chainwheel; wherein
the transmission belt of the human-powered device is in synchronization with the crank or the chainwheel;
the sensing system measures a left crank angle, a right crank angle, and an angular velocity; and
the computing processor calculates a real time power and a calorie consumption, and the sensing system further measures each leg power and a cadence relative to the crank angle for reference in real time riding or for use in training.

12. The sensing system of claim 9, wherein the human-powered device further includes a crank or a chainwheel; wherein
the transmission belt of the human-powered device is in synchronization with the crank or the chainwheel; and
the sensing system includes an automatically zeroing function or a manually zeroing function.

13. The sensing system of claim 12, wherein when the sensing signal of the strain gauge device is lower than a threshold value for more than a specific time period, the sensing system zeroes automatically and is thereby calibrated.

14. The sensing system of claim 9, wherein the sensing system further includes an optical sensor or a magnetic sensor, wherein
the optical sensor or the magnetic sensor is in synchronization with the transmission belt of the human-powered device; and
the human-powered device includes a crank or a chainwheel in synchronization with the transmission belt, the sensing system measures a force angle of each leg, an angle of the crank or the chainwheel, and a cadence.

15. The sensing system of claim 9, wherein a plurality of riding parameters of a rider is automatically captured by the sensing system based on the rider's bodyweight, or is manually input into the sensing system by the rider, and the plurality of riding parameters are recorded and output by the sensing system.

16. The sensing system of claim 15, wherein the bicycle is a pedelec and the sensing system further includes:
an electric assisted power output module electrically connected or communicatively connected to the computing processor for generating an electrical assisted power corresponding to the sensing signal and the riding parameters.

17. The sensing system of claim 9, wherein the strain gauge device includes a load cell, and the load cell is a compression load cell, an S-type load cell, a shear beam load cell, a single point load cell, or an annular load cell.

18. The sensing system of claim 17, wherein the load cell of the strain gauge device includes:
an elastic body; and
a strain gauge circuit disposed on the elastic body and formed by a plurality of electrical conductors, wherein when the elastic body deforms, at least one of the electrical conductors deforms to generate the sensing signal.

19. The sensing system of claim 9, wherein when the sensing signal of the strain gauge device is lower than a threshold value for more than a specific time period, the sensing system undergoes an angle reset calibration.

20. A pedelec with a plurality of riding parameters stored or recorded therein, the pedelec comprising:
a bicycle including a transmission belt;
a sensing device disposed on the bicycle, the sensing device including:
an idler configured into a ring body and including a pivot connecting portion and a ring contacting portion, the ring contacting portion being in contact with the transmission belt to receive a mechanical force applied to the idler by the transmission belt;
a strain gauge device including a rod slot disposed on a side of the strain gauge device, and configured to receive the mechanical force to generate a deformation and generates a sensing signal according to the deformation; and
a connecting rod assembly including a first end connected to the strain gauge device via the rod slot and the second end and a second end connected to the idler via the pivot connecting portion, so as to transmit the mechanical force from the idler to the strain gauge device;
a signal output device electrically connected or communicatively connected to the sensing device for receiving the sensing signal;
a computing processor electrically connected or communicatively connected to the signal output device for calculating a drive signal and data based on the sensing signal and the riding parameters; and
an electric assisted power output module electrically connected or communicatively connected to the computing processor for generating an electrical assisted power corresponding to the drive signal and displaying the data.

* * * * *